United States Patent
Yamaguchi et al.

(10) Patent No.: US 6,705,600 B2
(45) Date of Patent: Mar. 16, 2004

(54) LIQUID SEALING TYPE BODY MOUNT

(75) Inventors: Naoki Yamaguchi, Osaka (JP); Yoshitaka Ishimoto, Osaka (JP); Hiroyuki Takabayashi, Shioya-gun (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 56 days.

(21) Appl. No.: 10/094,767

(22) Filed: Mar. 11, 2002

(65) Prior Publication Data

US 2002/0145239 A1 Oct. 10, 2002

Related U.S. Application Data (63) Continuation-in-part of application No. 09/898,821, filed on Jul. 3, 2001, now Pat. No. 6,592,109.

(30) Foreign Application Priority Data

Jul. 31, 2000 (JP) ........................................ 2000-231588

(51) Int. Cl.$^7$ ................................................. F16M 9/00
(52) U.S. Cl. ................. 267/140.11; 267/141.2
(58) Field of Search ....................... 267/140.11, 140.12, 267/140.13, 140.3, 140.4, 140.5, 141, 141.2, 141.3, 141.4, 141.5, 141.7; 248/562, 636, 638

(56) References Cited

U.S. PATENT DOCUMENTS

| | | | | |
|---|---|---|---|---|
| 4,693,456 A | * | 9/1987 | Kanda | 267/140.12 |
| 5,188,346 A | * | 2/1993 | Hamada et al. | 267/140.12 |
| 5,887,844 A | * | 3/1999 | Fujiwara et al. | 267/140.12 |

FOREIGN PATENT DOCUMENTS

| | | | |
|---|---|---|---|
| JP | 62-188832 | | 8/1987 |
| JP | 63199939 A | * | 8/1988 |
| JP | 2-38730 | | 2/1990 |

* cited by examiner

*Primary Examiner*—Pam Rodriguez
(74) *Attorney, Agent, or Firm*—Jordan and Hamburg LLP (57) ABSTRACT

A liquid sealing type body mount has a stopper provided in liquid chambers to function properly with high rigidity and also to improve the durability. An inner cylinder is fixed to either a body or a frame and an outer cylinder is fixed to the other. A rubber elastomer is provided between the inner and outer cylinders and defines two liquid chambers, opposed to each other with respect to the inner cylinder and an orifice passage for communicating both the liquid chambers with each other. Inside both the liquid chambers there is provided the stopper with a metal portion which protrudes in the radial direction from the inner cylinder and is embedded in a rubber portion formed integrally with the rubber elastomer. There is a slight gap between the stopper and the chamber wall surface or the stopper slightly comes into contact with the chamber wall surface.

5 Claims, 7 Drawing Sheets

LIQUID SEALING TYPE BODY MOUNT

This is a Continuation-in-part, of application Ser. No. 09/898,821 filed Jul. 3, 2001, now U.S. Pat. No. 6,592,109.

BACKGROUND OF THE INVENTION

The present invention relates to a liquid sealing type body mount provided between a body of a vehicle and a frame on a support side such as a suspension or the like in order to support the body in a vibration-proof manner.

Heretofore, a body mount used in a rear suspension of a vehicle such as an automobile has been known in which there are provided an inner cylinder coupled to one of a body of the vehicle and a suspension-side frame for supporting this body, and an outer cylinder coupled to the other of them, these inner and outer cylinders are joined to each other by a rubber elastomer provided between them, two liquid chambers, which are formed at portions opposed to each other with the aforesaid inner cylinder between, are provided between the inner and outer cylinders, and these liquid chambers are communicated with each other by an orifice passage to obtain a vibration damping effect by a liquid fluid effect between the two liquid chambers (for example, Japanese Patent Laid-Open Nos. 38730/1990 and 188832/1987).

In a case that the thus structured mount is used with the aforesaid liquid chambers positioned in the front and back directions of the vehicle, a stable vibration-proof characteristic can be obtained in some degree in upper and lower directions where a load of the body is applied due to an effect of a decrease of a moving spring constant.

However, in the front and back directions where the large vibration is applied at the accelerating time such as the starting time or at the braking time, rigidity becomes small due to a presence of the liquid chambers inside the rubber elastomer and displacement due to vibration grows larger, thus impairing the durability. Therefore, it is taken into account to provide a stopper which controls excessive displacement due to vibration in the direction orthogonal to the axis present in the liquid chambers. If the stopper is only made of rubber, sufficient rigidity will not be brought about during stopper action, thus there lies a problem of durability.

The present invention provides a liquid sealing type body mount the structure of which allows the stopper provided in the liquid chambers to function properly with high rigidity and also to improve the durability.

SUMMARY OF THE INVENTION

The invention relates to a liquid sealing type body mount provided between a body of a vehicle and a frame on a support side in order to support the body in a vibration-proof manner. The body mount comprises an inner cylinder fixed to one of the aforesaid body and a frame, an outer cylinder fixed to the other of them, a rubber elastomer that is provided between these inner and outer cylinders and elastically couples them to each other, two liquid chambers, which are formed at portions of this rubber elastomer opposed to each other with respect to the aforesaid inner cylinder and formed between the inner and outer cylinders, and an orifice passage for communicating these liquid chambers with each other. Further, in the body mount in which the load input of the body is performed in the axial direction, inside both the liquid chambers there is provided a stopper with a metal portion which protrudes from the inner cylinder in the radial direction embedded in a rubber portion formed integrally with the rubber elastomer, wherein the stopper has a slight gap between its loading end surface and a chamber wall surface on the liquid chamber outer circumference or is projectingly formed to the extent that it comes into contact with the chamber wall surface. It is preferable that the gap between the loading end surface of the stopper and the chamber wall surface is 1 mm or so or less than 1 mm.

According to the body mount, when the vibrating power orthogonal to the axial center acts in the opposite direction of the aforesaid both liquid chambers, the loading end surface of the stopper protruded from the inner cylinder in the liquid chambers comes into contact with the chamber wall surface or an inner surface of the outer cylinder on its opposite side so as to perform a stopper action, whereby capable of controlling large displacement of more than a predetermined one.

At this time, since the loading end surface of the stopper keeps a slight gap from the chamber wall surface or is formed projectingly to the extent of lightly coming into contact with the chamber wall surface and the outside is made of rubber, the loading end surface comes into contact elastically and loosely when the stopper acts, thus reducing its shock. Accordingly, an effect produced on passengers is small, providing better responsive effect. Furthermore, since the metal part protruded from the inner cylinder is embedded inside the rubber portion, its rigidity is higher than that of rubber only excessive deformation can be restrained on the outside rubber portion, thereby stopper action can be performed securely. Since the rubber portion can be restrained from being distorted, the durability will also be kept properly. Especially, since the metal part of the stopper is formed integrally with the inner cylinder, the durability is further improved.

It is preferable that a circumferential width of the aforesaid stopper, including the inside metal part, is formed large, thereby the durability can be improved.

Provided that the loading end surface of the stopper is chamfered on both circumferential sides and its corner portion is also rounded, abutment on the chamber wall surface on the outer circumferential side of the liquid chamber will be loosened.

DESCRIPTION OF THE PREFERRED EMBODIMENTS

Next, modes for carrying out the invention will be described with reference to embodiments shown in drawings.

In the figures, reference numeral 1 designates an inner cylinder coupled and fixed to a body of a vehicle through an attaching member 100 on the vehicle body, which is formed in the shape of a comparatively thick cylinder and fixed to the attaching member 100 by a tightening member 101 such as a bolt. Reference numeral 2 designates an outer cylinder, which is attached and fixed through a rubber layer 104 to an annular attaching member 103 of a frame 102 on a support side such as a suspension for supporting the body by a forcing means, and which is nearly concentric with respect to the inner cylinder 1. These inner and outer cylinders 1 and 2 are usually made of a metal such as aluminum material, steel or the like.

Reference numeral 3 designates a rubber elastomer provided between the inner cylinder 1 and the outer cylinder 2. Two liquid chambers 4a, 4b that are formed between the inner and outer cylinders 1 and 2 and opened toward the periphery are provided at portions of this rubber elastomer 3, opposed to each other (symmetrical positions) with respect to the inner cylinder 1. These liquid chambers 4a, 4b are communicated with each other by an orifice passage 6 which will be described later.

In the aforesaid rubber elastomer 3, its inner surroundings are adhered by vulcanization to the inner cylinder 1, and to its outer surroundings, a middle cylinder 5 fitted inside the outer cylinder 2 is adhered by vulcanization. This middle cylinder 5 has a flange portion 51 faced outward on the lower end side, and window-like openings 5a, 5b at its portions corresponding to both the liquid chambers 4a, 4b. And, on the peripheral surface of this middle cylinder 5, a rubber layer 31 for sealing is formed integrally with the rubber elastomer 3 is provided, a convex rib 32 is provided at a part of the rubber layer 31, and this middle cylinder 5 is air-tightly fitted inside the outer cylinder 2 through the rubber layer 31 and the convex rib 32, whereby the rubber elastomer 3 is provided between the inner cylinder 1 and the outer cylinder 2 and the liquid chambers 4a, 4b in which liquid is sealed are formed. The aforesaid outer cylinder 2 is caulked in a state where a flange 21 at the lower end portion thereof is fitted to the flange portion 51 of the middle cylinder 5.

Further, at the peripheral portion of the middle cylinder 5, a recess groove 6a extending in the circumferential direction between the openings 5a and 5b is provided. By fitting the outer cylinder 2 to the outside of the middle cylinder 5, the recess groove 6a functions as an orifice passage 6 for communicating the liquid chambers 4a and 4b to each other.

Each opening angle θ in the circumferential direction of the two liquid chambers 4a and 4b, that is, an opening angle θ of the liquid chamber defined by the opening 5a and 5b of the middle cylinder can be set optionally according to the characteristics. However, it is usually set in a range not less than 60° and not more than 140°. In this connection, the aforesaid opening angle θ is about 70° in this embodiment. From a viewpoint of durability and so on, it is preferably 80° or more.

Reference numeral 7 designates a stopper that protrudes in both the liquid chambers 4a and 4b from the inner cylinder 1 in the radial direction. When a large displacement in the protruding direction of the stopper 7 is produced, the stopper comes into contact with the chamber wall surface opposed to the stopper, that is, the inner surface of the outer cylinder 2, whereby the large displacement is controlled. The stopper 7 is formed to project to such degree that its leading end surface is spaced by a small gap from the chamber wall surface on the liquid chamber peripheral side or slightly comes into contact with the chamber wall surface. The gap is set to, for example, about 1 mm or less. For example, the aforesaid leading end surface may slightly come into contact with the chamber wall surface. Thereby, when stopper action is performed, a shock due to the contact with the chamber wall surface is smaller. Further, there is also an effect that the gap provides fluid resistance of liquid at the time of the vertical (axial) vibration.

The stopper 7 is usually formed, as shown in the figures, by embedding a metal portion 71 integrally fixed to the inner cylinder 1 in a rubber portion 72 formed integrally with the rubber elastomer 3 so that there moderately exists rigidity and the contact of the stopper 7 with the aforesaid chamber wall surface is elastically performed. To set the circumferential width of this stopper 7 including the metal portion 71 large can prevent excessive distortion and can improve durability.

In the body mount having the aforesaid constitution, both the end walls 40a, 41a; 40b, 41b in the axial direction of both the liquid chambers 4a, 4b are formed of a rubber film formed integrally with the rubber elastomer 3 and having a predetermined thickness, and the rubber film slopes from the inner cylinder 1 to the outer cylinder 2 outward in the axial direction, extends nearly in line, and is coupled to the outer cylinder 2. Namely, as a whole, the liquid chambers 4a, 4b have a longitudinal section nearly in the shape of Y on the periphery side.

An angle of inclination of each of the end walls 40a, 41a; 40b, 41b composed of the rubber film in relation to the axial center is set in a range of 15° to 70°, preferably in a range of 30° to 60°. Further, the thickness of each of the end walls 40a, 41a; 40b, 41b composed of the rubber film is set in a range of 2 to 6 mm.

Figure 5:
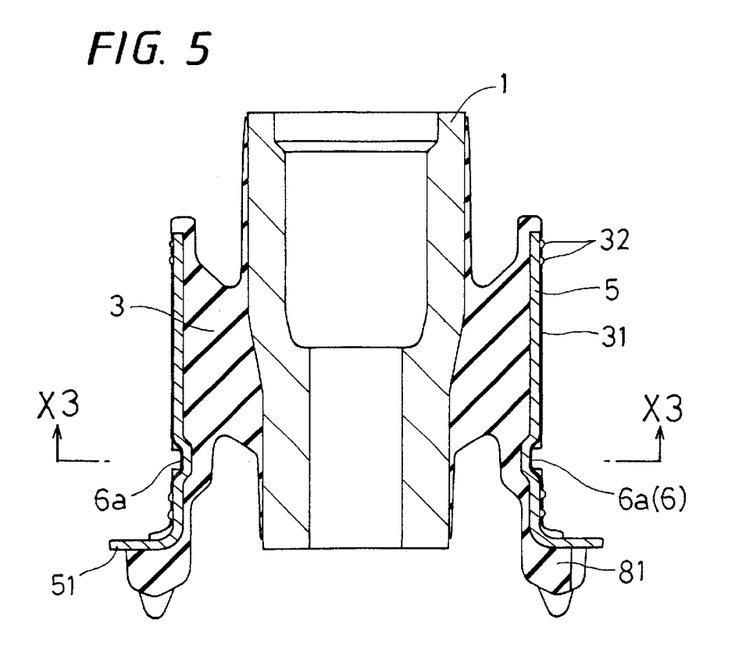
FIG. 5 is a sectional view taken along a fine of X2–X2 in FIG. 4.
Figure 6:
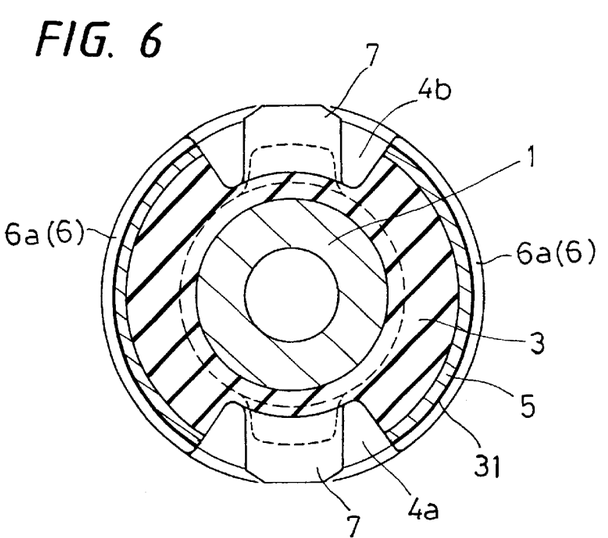
FIG. 6 is a sectional view taken along a line of X3–X3 in FIG. 5.
Figure 7:
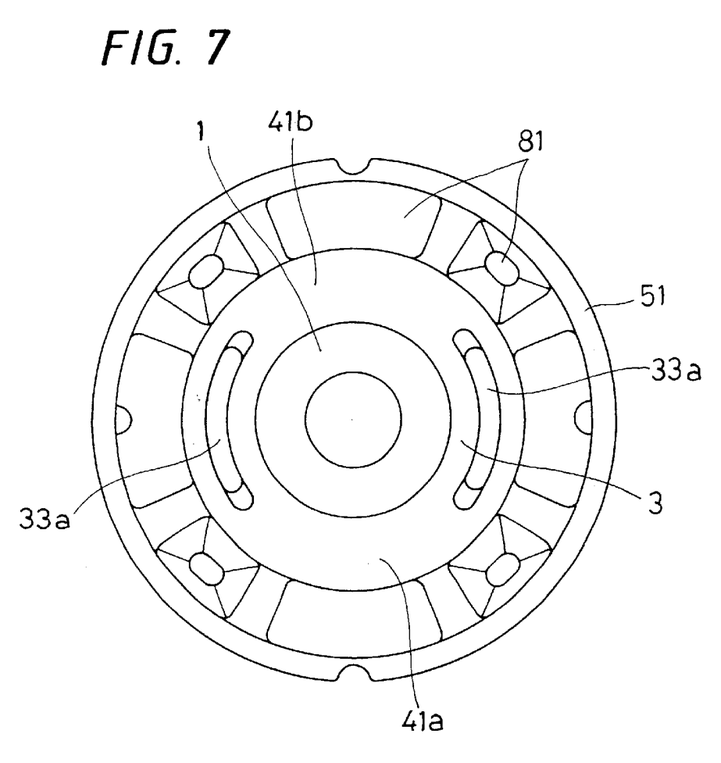
FIG. 7 is a bottom view of the same omitting the outer cylinder.

Further, both the end surfaces in the axial direction of the rubber elastomer 3 between both the liquid chambers 4a and 4b are not limited to the linearly inclined surfaces similar to the outer surfaces of the end wall 40a, 41a; 40b, 41b composed of the rubber film or the wavy inclined surface. Particularly, the axial end surfaces of the rubber elastomer 3 on the downward side may be such concave surfaces that they form the inclined surfaces reverse to the inclined surfaces of the end walls 41a, 41b, as shown in FIG. 5. Reference numeral 33a designates its concave portion.

Further, on the lower surface of the flange portion 51 of the middle cylinder 5, a stopper rubber 81 formed integrally with the rubber elastomer 3 is provided by a vulcanizing adhesion means in order to control the larger displacement than the predetermined displacement by bringing a fitting plate 82 fixed to the lower end of the inner cylinder 1 into contact with the stopper rubber 81 elastically when the inner cylinder 1 greatly moves upward with the vibration of the body. Further, in the attaching state of FIG. 1, to the inner cylinder 1, upward of the attaching member 103 of the frame 102, a stopper member 85 in which a stopper rubber 84 is provided for a ring metal part 83 is fitted, and the lower surface of the attaching member 100 comes into contact with the stopper member 85 elastically at the time of the downward displacement of the body thereby to control the larger displacement than the predetermined displacement.

Figure 1:
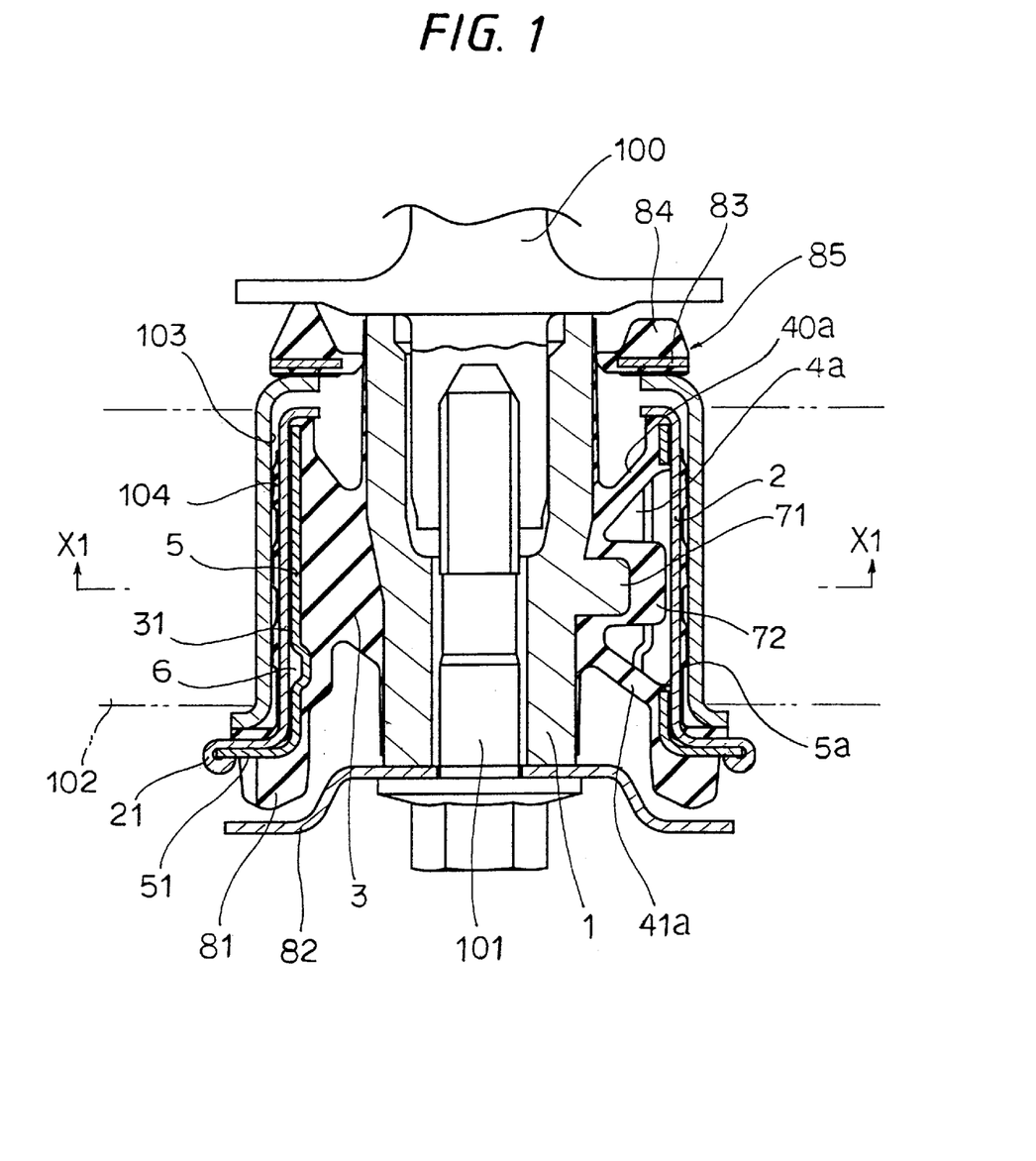
FIG. 1 is a longitudinal sectional view taken along a line of X–Y in FIG. 2, showing a first embodiment of a body mount of the present invention.
Figure 2:
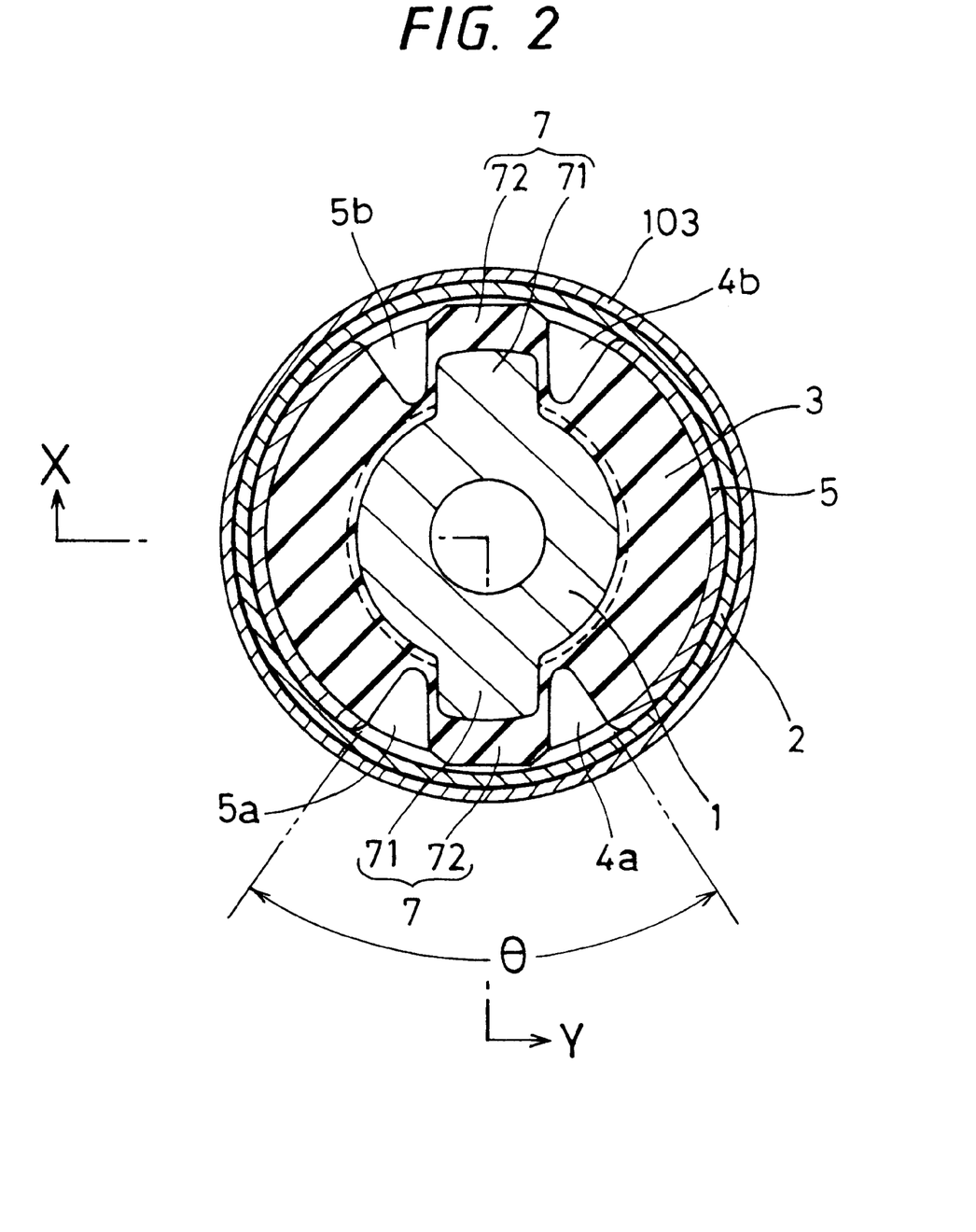
FIG. 2 is a sectional view taken along a line of X1–X1 in FIG. 1.
Figure 3:
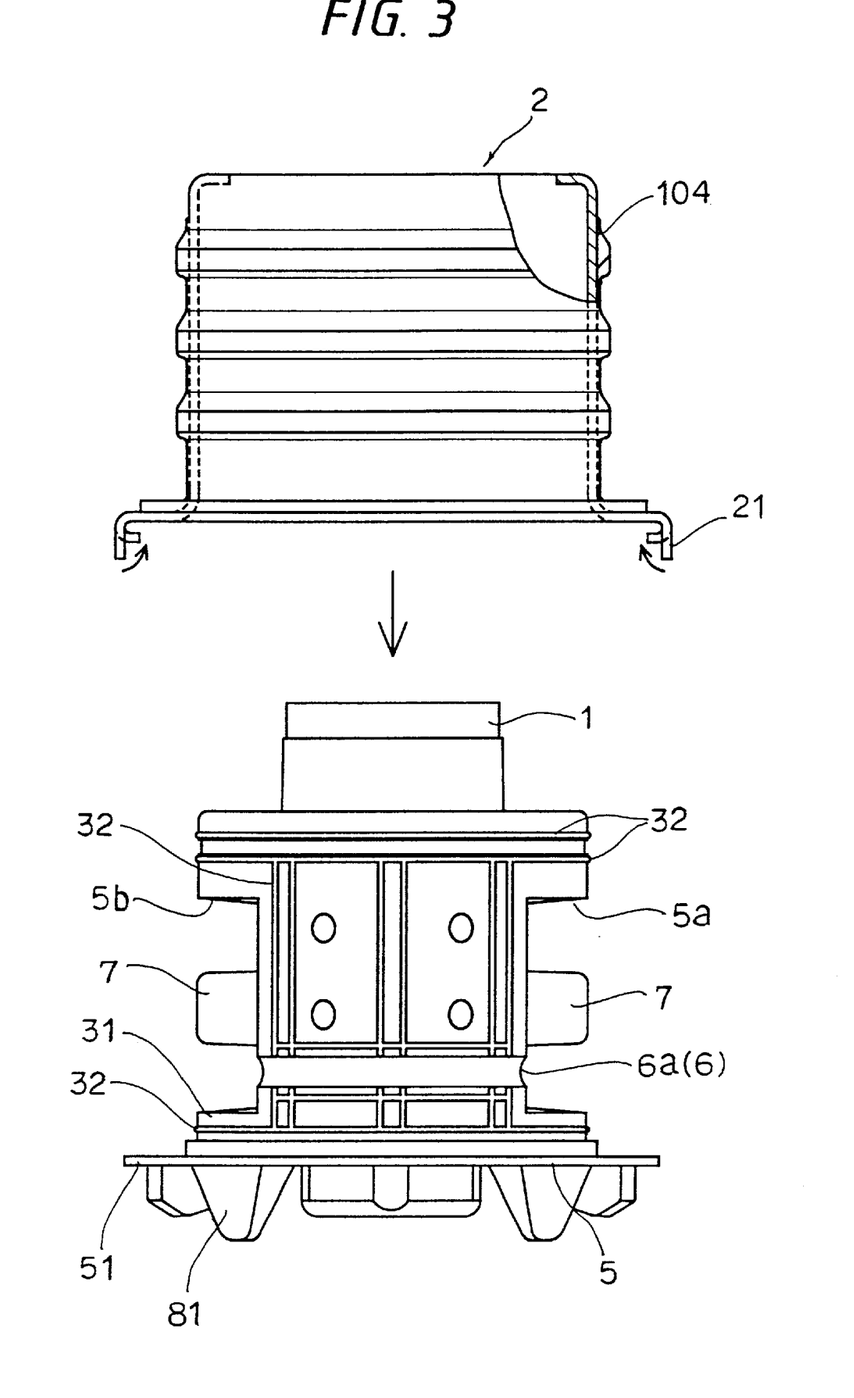
FIG. 3 is a partially cutaway side view of the same in a state where an outer cylinder is separated.
Figure 4:
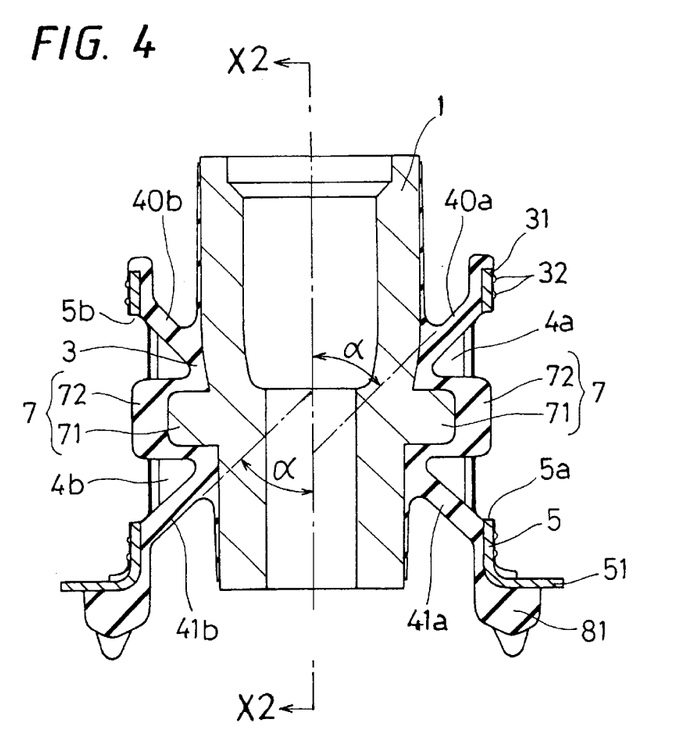
FIG. 4 is a longitudinal sectional side view omitting the outer cylinder.

The thus structured liquid sealing type body mount of the invention is used in a rear suspension or the like of a vehicle such as an automobile as shown in FIG. 1 so that the inner cylinder 1 is fixed to the attaching member 100 on the body side by the tightening member 101 such as a bolt and the outer cylinder 2 is forced in the annular attaching member 103 on the frame 102 of the suspension thereby to be fixed.

Particularly, in this case, the body mount is attached so that each of the liquid chambers 4a and 4b are positioned in the front and back directions of the vehicle.

In the aforesaid use of this body mount, the moving spring constant in the vertical direction, where the load of the body is applied, can be lowered. Further, also in the front and back directions orthogonal to the axial center and obliquely in the front and back directions, where the large vibration is applied at the accelerating time such as the vehicle starting time or at the braking time, since the rubber films forming the end walls 40a, 41a; 40b, 41b in the axial direction of the liquid chambers 4a, 4b are formed obliquely, the rigidity in relation to the vibration in the aforesaid directions and the elasticity becomes smaller than in case of the rubber film orthogonal to the axial center, so that the moving spring constant is reduced by the effect of this rubber film, which increases the vibration damping effect in cooperation with the liquid fluid effect between both the liquid chambers 4a and 4b.

For example, in a frequency of 15 Hz, in case of a damping coefficient of about 4N‡s/mm, the moving spring constant of about 100 Hz can be reduced to as law as about 1000N/mm. Hereby, the good vibration-proof characteristic in relation to the vibration in the front and back directions and obliquely in the front and back directions can be obtained.

In the case of vibration in the opposite directions of both the liquid chambers 4a and 4b, the loading end surface of the stopper 7 in both the liquid chambers 4a and 4b comes into contact with the chamber wall surface opposite to it or on the inner surface of the outer cylinder 2, so that the stopper 7 can perform stopper action and control any larger displacement than predetermined.

Figure 8:
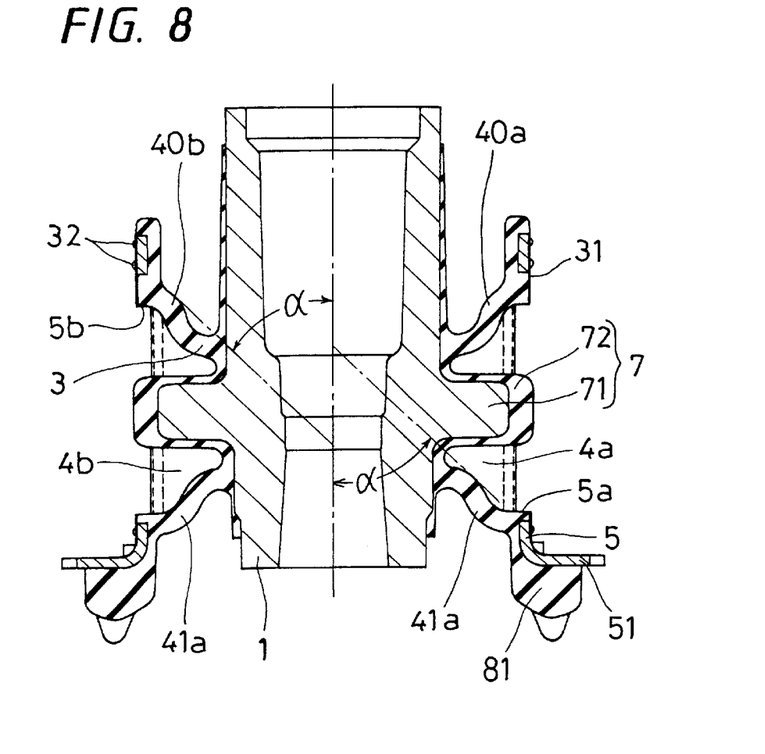
FIG. 8 is a longitudinal sectional view omitting an outer cylinder, showing a second embodiment of the invention.
Figure 9:
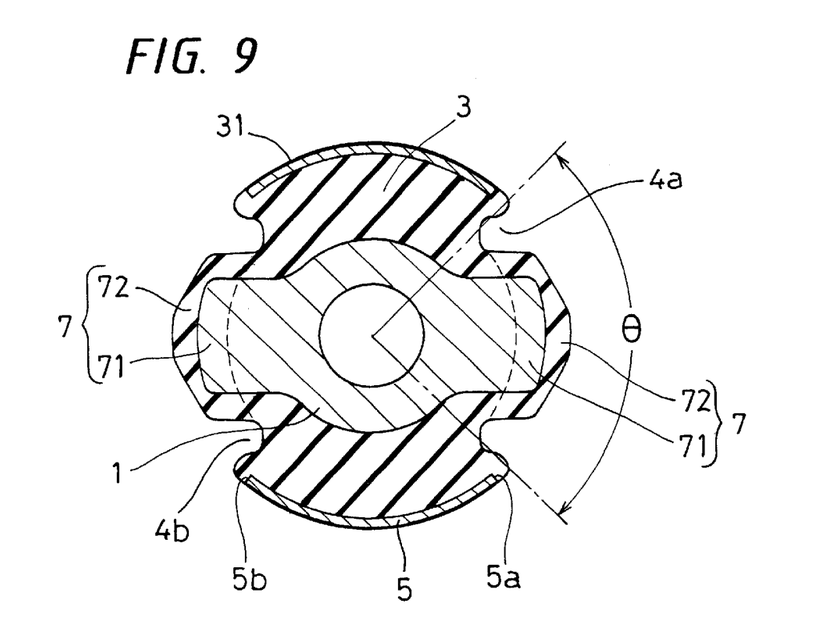
FIG. 9 is a transverse sectional view of the same omitting the outer cylinder.
Figure 10:
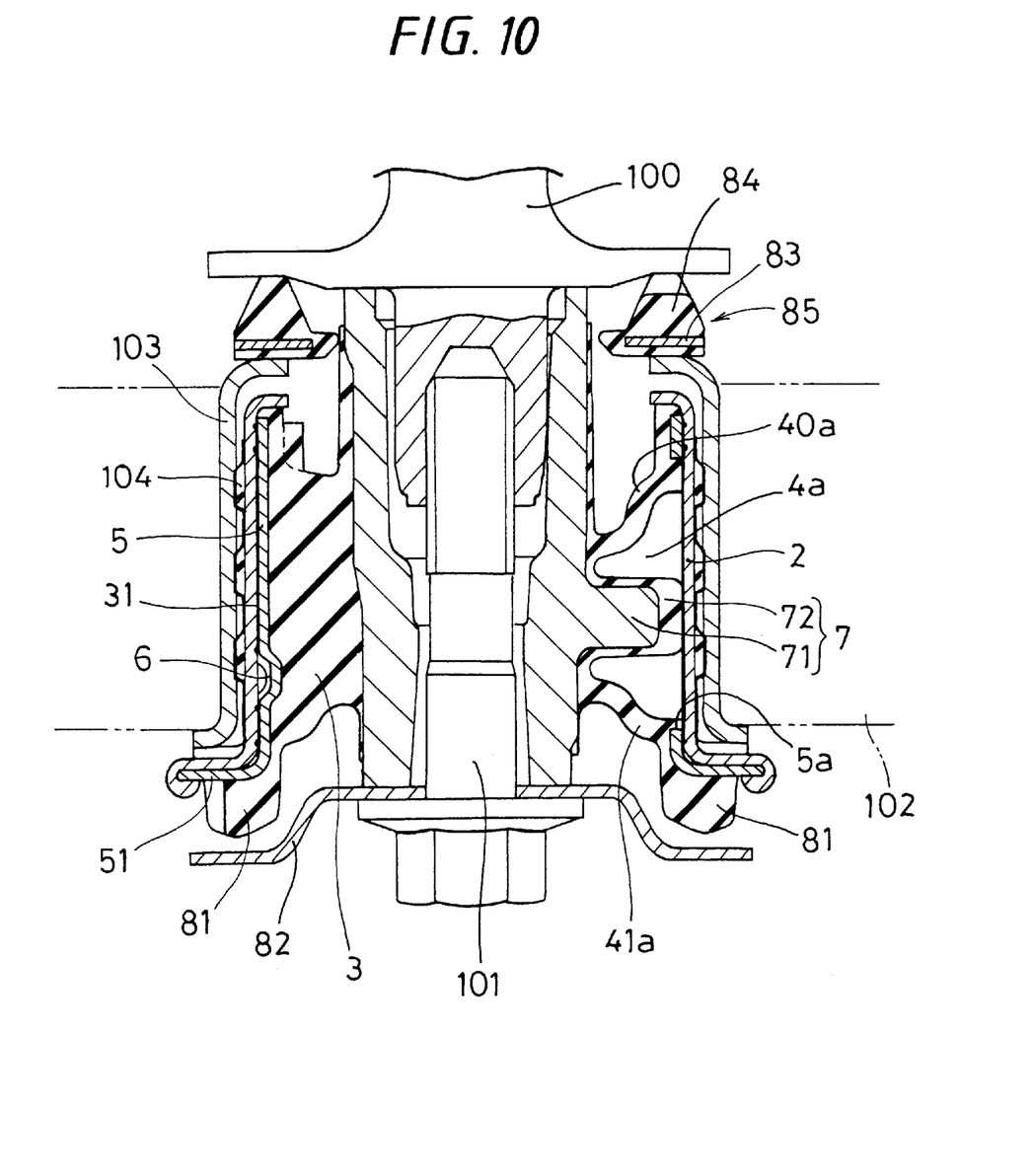
FIG. 10 is a longitudinal sectional view of the same showing the attaching state of the body mount.

FIGS. 8 to 10 show a second embodiment of the invention, in which since its basic constitution is common to that of the above embodiment, the same components are denoted by the same reference characters and the detailed description thereof is omitted.

In this embodiment, both end walls 40a, 41a; 40b, 41b composed of a rubber elastomer 3 in the axial direction of two liquid chambers 4a and 4b opposed to each other with respect to an inner cylinder 1 extend from the inner cylinder 1 side in the radial direction so as to form the nearly wavy shape comprising continuous curved surfaces with reverse curvatures alternately. The closer to the outer cylinder 2 side the end wall is, the more it is expanded outward in the axial direction. In this case, it is preferable that an angle of inclination of a line connecting joints at which each of the end walls 40a, 41a; 40b, 41b meets the inner cylinder 1 or the outer cylinder 2 in relation to the axial center is set in a range similar to that in the above first embodiment. Also, it is preferable to set the thickness of the end wall similarly.

In case that the end walls 40a, 41a; 40b, 41b are formed nearly in the wavy shape like in this embodiment, since the free length of a rubber film forming the end wall is extent, which is different from the case that the end walls extend obliquely in line or in a slightly curved manner as shown in FIGS. 1 to 7, stress at the time of distortion can be reduced and durability is improved.

Further, in case of the embodiment shown in FIGS. 8 to 10, opening angles θ in the circumferential direction of both the liquid chambers 4a, 4b are set as large as 90° to 100°. By thus setting the opening angle θ large, preferably to 80° and more, the areas of the rubber films of the end walls 40a, 41a; 40b, 41b in the axial direction of the liquid chambers are made large, whereby durability can be further improved.

Further, in this embodiment, inside both liquid chambers 4a and 4b there is provided the stopper 7 in which a metal portion 71, protruding in the radial direction from the inner cylinder 1, is embedded in a rubber portion 72. The stopper has a slight gap at its loading end surface, similar to the embodiment described above, from the chamber wall surface on the outer circumferential side of the liquid chamber, or is formed to project to the extent that it slightly comes into contact with the chamber wall surface. The gap between the loading end surface and the chamber wall surface is, for example, 1 mm or so or less than 1 mm, or projectingly formed to the extent that it slightly comes into contact with the chamber wall surface. Or, both the inner metal portion 71 and the outer rubber portion 72 are formed large in their circumferential widths to improve the durability. Furthermore, the loading end surface of the stopper 7 is slightly chamfered and formed obliquely on both circumferential sides at the surface orthogonal to the direction of stopper protrusion, and its corner portion is rounded, so that it can loosely come into contact with the chamber wall surface.

Also in this second embodiment, by attaching the body mount as shown in FIG. 10 and using it similarly to in the first embodiment, at the vibrating time in the opposite direction in both the liquid chambers 4a and 4b, the loading end surface of the stopper 7 in both the liquid chambers 4a and 4b elastically comes into contact with the chamber wall surface opposite to it or on the inner surface of the outer cylinder 2, so that stopper action is thereby performed and large displacement, more than a predetermined one, is prevented.

By the effect of the rubber films forming the respective end walls 40a, 41a; 40b, 41b in the axial direction of both the liquid chambers 4a, 4b, the moving spring constant can be reduced, and the vibration damping effect can also be improved in cooperation with the liquid fluid effect between the liquid chambers 4a and 4b. Further, since the rubber film forming the aforesaid end walls is formed nearly in a wavy shape, the free length of the rubber film is long, and the area of the rubber film is large, the durability can be also improved greatly.

For example, when a bench test corresponding to a real car running was carried out to compare the body mount in this second embodiment in which the end wall in the axial direction of the liquid chamber is formed nearly in the wavy shape and the body mount in the first embodiment in which the end wall is formed linearly, it was found that the body mount in the second embodiment had four times or more as long lifetime as the body mount in the first embodiment had.

As described above, according to the liquid sealing type body mount of the invention, when the vibrating power orthogonal to the axial center acts in the opposite direction of both liquid chambers, the loading end surface of the stopper protruded from the inner cylinder in the liquid chambers elastically and loosely abuts on the chamber wall surface or the inner surface of the outer cylinder on its opposite side, so that stopper action is performed properly, large displacement, more than a predetermined one, can be prevented, and good durability is also provided.

What is claimed is:

1. A liquid sealing type body mount arrangement comprising:
   body;
   a support frame;
   an inner cylinder fixed to one of said body and support frame and defining a body mount axis;

an outer cylinder fixed to another one of said body and said support frame such that a load of said body is input in a direction of the body mount axis;

an elastomer member provided between and coupling said inner and outer cylinders;

said elastomer member defining two liquid chambers opposed to each other and symmetrical with respect to a plane including said body mount axis, said two liquid chambers being disposed between the inner and outer cylinders;

an orifice passage for communicating said two liquid chambers with each other; and a stopper provided inside each of the two liquid chambers, the stopper having a metal portion which protrudes in the radial direction from the inner cylinder and is embedded in a rubber portion formed integrally with the rubber elastomer, wherein the stopper has a loading end surface directed radially outward toward a chamber wall surface, and the loading end surface and the chamber wall surface define a gap therebetween at outer circumference sides of each of the two liquid chambers or contact one another.

2. The liquid sealing type body mount arrangement according to claim 1, wherein the gap between the loading end surface of the stopper and the chamber wall surface is about 1 mm or less.

3. The liquid sealing type body mount arrangement according to claim 1 or 2, wherein the metal portion of the stopper is formed integrally with the inner cylinder.

4. The liquid sealing type body mount arrangement according to any one of claim 1 or 2, wherein a circumferential width of the stopper is larger than a circumferential width of the metal portion embedded inside.

5. The liquid sealing type body mount arrangement according to any one of claim 1 or 2, wherein the loading end surface of the stopper is chamfered circumferentially on both sides extending to rounded axially extending rounded corner portions.

* * * * *